(12) United States Patent
Zejda et al.

(10) Patent No.: US 10,572,409 B1
(45) Date of Patent: Feb. 25, 2020

(54) SPARSE MATRIX PROCESSING CIRCUITRY

(71) Applicant: Xilinx, Inc., San Jose, CA (US)

(72) Inventors: Jindrich Zejda, Saratoga, CA (US); Ling Liu, Dublin (IE); Yifei Zhou, San Jose, CA (US); Ashish Sirasao, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 15/976,722

(22) Filed: May 10, 2018

(51) Int. Cl.
*G06F 3/00* (2006.01)
*G06F 5/00* (2006.01)
*G06F 13/20* (2006.01)
*G06N 3/08* (2006.01)

(52) U.S. Cl.
CPC .............. *G06F 13/20* (2013.01); *G06N 3/08* (2013.01)

(58) Field of Classification Search
CPC ........................................................ G06F 13/20
USPC ........................................................... 710/52
See application file for complete search history.

(56) References Cited

U.S. PATENT DOCUMENTS

2015/0227367 A1\* 8/2015 Eyole-Monono ............................ G06F 9/30036
712/7

OTHER PUBLICATIONS

Fowers, Jeremy et al.,"A High Memory Bandwidth FPGA Accelerator for Sparse Matrix-Vector Multiplication," Proc. of the 2014 IEEE 22nd Annual International Symposium on Field-Programmable Custom Computing Machines (FCCM), May 11, 2014, 8 pp., IEEE, Piscataway, New Jersey, USA.
Wikipedia, "Sparse Matrix," Dec. 29, 2017, 11 pp., https://en.wikipedia.org/wiki/Sparse_matrix.

\* cited by examiner

*Primary Examiner* — Chun Kuan Lee
(74) *Attorney, Agent, or Firm* — LeRoy Maunu

(57) ABSTRACT

A memory arrangement can store a matrix of matrix data elements specified as index-value pairs that indicate row and column indices and associated values. First split-and-merge circuitry is coupled between the memory arrangement and a first set of FIFO buffers for reading the matrix data elements from the memory arrangement and putting the matrix data elements in the first set of FIFO buffers based on column indices. A pairing circuit is configured to read vector data elements, pair the vector data elements with the matrix data elements, and put the paired matrix and vector data elements in a second set of FIFO buffers based on column indices. Second split-and-merge circuitry is configured to read paired matrix and vector data elements from the second set of FIFO buffers and put the paired matrix and vector data elements in a third set of FIFO buffers based on row indices.

20 Claims, 16 Drawing Sheets

$$A = \begin{bmatrix} a00 & 0 & 0 & 0 & 0 & a05 & a06 & a07 \\ 0 & a11 & 0 & 0 & 0 & 0 & 0 & 0 \\ 0 & 0 & a22 & 0 & 0 & 0 & 0 & 0 \\ 0 & 0 & 0 & a33 & a34 & 0 & 0 & 0 \\ 0 & 0 & 0 & 0 & a44 & 0 & 0 & 0 \\ 0 & 0 & 0 & 0 & a54 & a55 & 0 & 0 \\ 0 & 0 & 0 & 0 & 0 & 0 & a66 & 0 \\ 0 & 0 & a72 & 0 & 0 & 0 & 0 & a77 \end{bmatrix}$$

$$B = \begin{bmatrix} b0 \\ b1 \\ b2 \\ b3 \\ b4 \\ b5 \\ b6 \\ b7 \end{bmatrix}$$

$$C = \begin{bmatrix} c0 + a00*b0 + a05*b5 + a06*b6 + a07*b7 \\ c1 + a11 * b1 \\ c2 + a22 * b2 \\ c3 + a33*b3 + a34*b4 \\ c4 + a44 * b4 \\ c5 + a54*b4 + a55*b5 \\ c6 + a66 * b6 \\ c7 + a72*b2 + a77*b7 \end{bmatrix}$$

SPARSE MATRIX PROCESSING CIRCUITRY

TECHNICAL FIELD

The disclosure generally relates to circuitry for processing sparse matrices.

BACKGROUND

Matrix multiplication is used in many fields of engineering, numerical analysis, science, and machine learning. Computational complexity is on the order of $O(n^3)$, making hardware acceleration highly desirable.

Many matrix multiplication problems involve very large matrices that are sparse, and sparse matrices present various challenges for hardware acceleration. A sparse matrix is a matrix in which most of the matrix data elements have the value 0. Whereas acceleration of matrix multiplication involving dense matrices is limited by the computational speed of the digital signal processors (DSPs) employed, such as for multiply-and-accumulate functions, the acceleration of matrix-vector multiplication involving sparse matrices can be limited by vector loading, such as when sparse matrices result from pruning in neural networks, loading of the sparse matrix, lookup of vector column values in wide matrices, and scheduling of both row and column multiply-and-accumulate operations.

A number of different approaches have been employed for sparse matrix-vector multiplication. Though a dense matrix multiplier can be used, the dense matrix multiplier may be suitable only as a temporary solution or in cases in which the matrix is nearly dense. A size-limited custom multiplier may be useful if both weight matrices and a small data set can fit into a cache memory in the accelerator. However, the custom multiplier will be limited in size and may have a minimum density requirement (e.g., >5% non-zero values) or distribution requirement (e.g., similar number of non-zero values in each row). Hybrid solutions can involve caching, static scheduling and interleaving operations, and/or vector replications.

SUMMARY

A circuit arrangement includes a memory arrangement, three sets of first-in-first-out (FIFO) buffers, and first and second split-and-merge circuitry, and a pairing circuit. The memory arrangement is configured for storage of a matrix having C columns and R rows of matrix data elements specified as index-value pairs that indicate respective row and column indices and associated values. The first, second, and third sets of FIFO buffers include P FIFO buffers. The first split-and-merge circuitry is coupled between the memory arrangement and the first set of FIFO buffers and is configured to read the matrix data elements from the memory arrangement and put the matrix data elements in the first set of FIFO buffers based on the associated column indices. The pairing circuit is coupled to the memory arrangement and between the first and second sets of FIFO buffers and is configured to read vector data elements and pair the vector data elements with the matrix data elements and put the vector data elements and paired matrix data elements in the second set of FIFO buffers based on the associated column indices. The second split-and-merge circuitry is coupled between the second and third sets of FIFO buffers and is configured to read paired matrix data elements and vector data elements from the second set of FIFO buffers and put the paired matrix data elements and vector data elements in the third set of FIFO buffers based on the associated row indices.

A method includes reading matrix data elements of a matrix from a memory arrangement and putting the matrix data elements in a first set of first-in-first-out (FIFO) buffers based on the associated column indices. The matrix has C columns and R rows of matrix data elements specified as index-value pairs that indicate respective row and column indices and associated values. The first set of FIFO buffers includes P FIFO buffers. The method reads vector data elements from the memory arrangement and pairs the vector data elements with the matrix data elements. The paired matrix and vector data elements are put in a second set of FIFO buffers based on the associated column indices. The second set of FIFO buffers includes P FIFO buffers. Paired matrix data elements and vector data elements are read from the second set of FIFO buffers and put in a third set of FIFO buffers based on the associated row indices. The third set of FIFO buffers includes P FIFO buffers.

Other features will be recognized from consideration of the Detailed Description and Claims, which follow.

BRIEF DESCRIPTION OF THE DRAWINGS

Various aspects and features of the circuits and methods will become apparent upon review of the following detailed description and upon reference to the drawings in which.

DETAILED DESCRIPTION

Figures 1, 2:
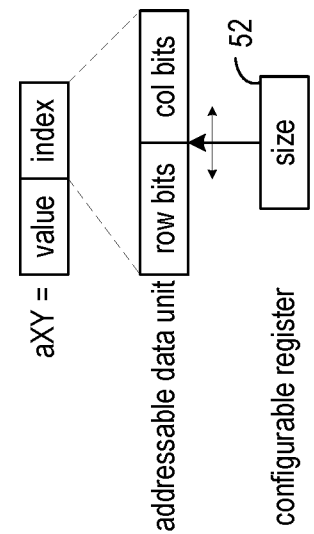
FIG. 1 shows an exemplary matrix A, an exemplary vector B, and the resulting vector C, which are presented to aid in describing the disclosed circuits and methods.
FIG. 2 shows an exemplary format of matrix data elements and vector data elements stored in a RAM.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed circuits and methods provide improved performance without having to increase the bandwidth for memory access. The circuitry can be easily adapted to different storage formats of matrix data elements and vector data elements. Also, padding of rows of matrix data elements is unneeded. Partitioning of row vectors and non-zero values permits processing of larger matrices and vectors.

The disclosed circuitry formats data elements of an input sparse matrix into parallel streams of paired matrix-vector data elements that can be processed in parallel by multiply-and-accumulate circuits. The vectors are loaded into multiple on-chip memory banks to enable the parallel stream processing. A memory arrangement can be configured for storage of a matrix having C columns and R rows of matrix data elements specified as index-value pairs that indicate respective row and column indices and associated values. A first circuit reads the sparse matrix data elements from the memory arrangement and puts the matrix data elements into a first set of N FIFO buffers based on the associated column indices, resulting in matrix data elements having the same column index being shifted through the same FIFO buffer of the first set of FIFO buffers. A second circuit pairs matrix data elements output from the first set of FIFO buffers with vector data elements and shifts the paired matrix-vector data elements into a second set of FIFO buffers. A third circuit rearranges the paired matrix-vector data elements from the second set of FIFO buffers into a third set of FIFO buffers based on the row indices of the data elements. The paired matrix-vector data elements in the third set of FIFO buffers are arranged such that the paired matrix-vector data elements having the same row index are shifted through the same FIFO buffer of the third set of FIFO buffers. The output from each FIFO buffers can be shifted out and input to a multiply-and-accumulate (MAC) circuit for computing dot products.

FIG. 1 shows an exemplary matrix A, an exemplary vector B, and the resulting vector C, which are presented to aid in describing the disclosed circuits and methods. The matrix data elements are denoted aXY, where X is the row number and Y is the column number of the data element. Each element in the resulting vector C is a dot product of one of the rows of A and the vector data elements b0, . . . , b7, plus a previously accumulated value c0, . . . , c7, which is the dot product of one of the rows of another sparse matrix and the vector data elements b0, . . . , b7, plus a previously accumulated value, etc.

FIG. 2 shows an exemplary format of sparse matrix data elements and vector data elements stored in a RAM 50. The matrix data elements are stored as index-value pairs, shown in the RAM as aXY. The "a" portion of the index-value pair references the value of the matrix data element, the "X" portion indicates the row, and the "Y" portion indicates the column.

Each index can be stored in a single addressable data unit. For example, a word of RAM can be split between storing a row value and a column value. Some of the bits of the word can be dedicated to storing the row value, and the remaining bits can be dedicated to storing the column value.

The number of bits allocated to the row value and the column value can be configured by a size register 52 in an exemplary implementation and can be changed according to application requirements. For example, one application may require more bits to represent the row values than to represent the column values, and another application may require more bits to represent the column values than to represent the row values.

Figure 3:
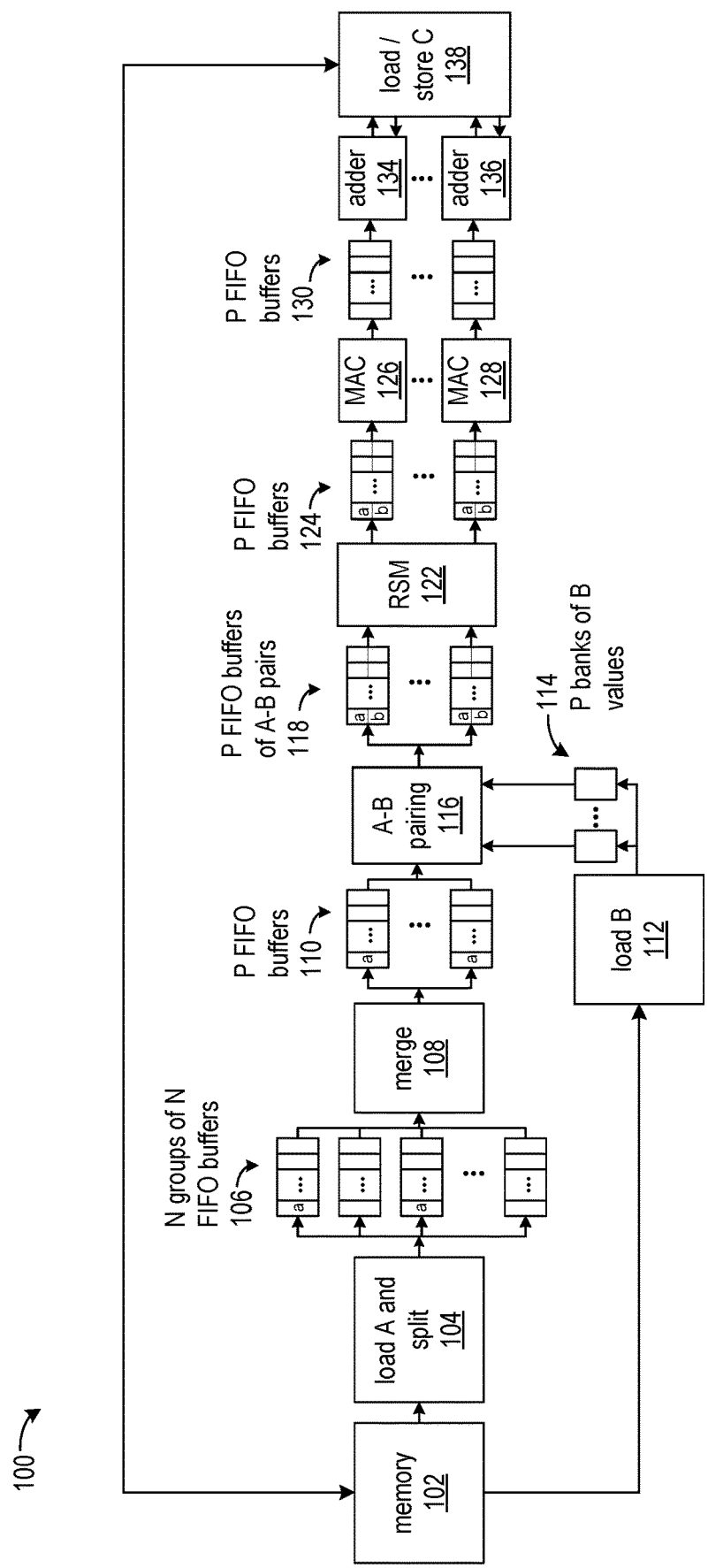
FIG. 3 shows an exemplary circuit arrangement for performing matrix multiplication.

FIG. 3 shows an exemplary circuit arrangement 100 for performing sparse matrix-vector multiplication. The circuit generally formats the matrix data elements and vector data elements into pipelined sequences of pairs of values that can be multiplied and accumulated in parallel. The matrix data elements, vector data elements, and the resulting vector can be stored in a memory arrangement 102. The memory arrangement can include one or more individually addressable memories having single or multiple read and write ports. The RAMs of the memory arrangement can be on-chip or off-chip.

Circuits 104 and 108 create parallel streams of matrix data elements for pairing with the vector data elements. Together with FIFO buffers 106 and 110, circuits 104 and 108 split and merge the input matrix data elements. Circuit 104 loads matrix data elements (values of A) into selected ones of N groups of N FIFO buffers 106. N is the number of parallel streams chosen for the implementation. N can be selected based on the number of index-value pairs obtained from each off-chip RAM access.

Each matrix data element is an index-value pair, and circuit 104 can read multiple index-value pairs from the memory arrangement 102 in a single read operation. Each index-value pair of the multiple pairs read from the memory arrangement is associated with one group of the N groups of FIFO buffers. An index-value pair is stored into one FIFO buffer of the N FIFO buffers in one of the groups based on the column index. Thus, circuit 104 splits the matrix data elements into separate data streams based on the column indices. As each group of FIFO buffers includes N FIFO buffers and each index-value pair is stored into only one of the N FIFO buffers in a group, some of the FIFO buffers in the group will have empty slots. The value of N is generally defined by parallelism of the number of index-value pairs that can be read in parallel, such as by way of the number of vector storage banks or number of memory ports.

Circuit 108 merges the index-value pairs from the N groups of N FIFO buffers into P FIFO buffers 110 for pairing with the vector data elements. Matrix data elements in the same column are stored in one of the N FIFO buffers 110. The value of P can be defined by coarse parallelism of the MAC circuits 126, . . . , 128.

Circuit 112 reads vector data elements (from vector B) and loads the vector data elements into one of P banks 114. The indices of the vector data elements in the vector are used to sort the vector data elements. Each bank can be a small RAM that is addressed by the column index of a matrix data element to be paired with one of the vector values in the bank.

Circuit 116 pairs the matrix data elements from the P FIFO buffers 110 with the vector data elements in the banks 114 and puts the paired matrix-vector elements in the P FIFO buffers 118. Each paired matrix-vector element includes the value of the element from the matrix and the value of the element from the vector by which the matrix value is to be multiplied.

Circuit 122 splits and merges the matrix-vector value pairs from the P FIFO buffers 118 into the P FIFO buffers 124 based on the row indices of the matrix data elements. The splitting and merging of the matrix-vector value pairs uses the same approach as circuits 104 and 108 that split and merge the matrix data elements based on column indices, except that the splitting and merging is based on rows.

MAC circuits 126, . . . , 128 multiply the values of the matrix data elements by the paired values of the vector data elements in the FIFO buffers 124. In one implementation, there can be one MAC circuit for each of the P FIFO buffers 124. Alternatively, time multiplexing of MAC operations between two or more of the FIFO buffers 124 can reduce the number of MAC circuits. The MAC circuits output accumulated values to P FIFO buffers 130, which provide input values to the adder circuits 134, . . . , 136.

The adder circuits 134, . . . , 136 work in conjunction with the circuit 138 to add values computed by the MAC circuits 126, . . . , 128 to previously accumulated values that were stored back to the memory arrangement 102. For large matrices, the circuit arrangement 100 can compute dot products for portions of the matrix and vector, and the computed partial results can be stored in the memory arrangement 102 and combined with the dot products for other portions of the matrix and vector. To mitigate latency, each individual adder circuit 134, . . . , 136 can include multiple adders such that the number of adders within each adder circuit 134, . . . , 136 is sufficient to offset the latency of the addition operation.

The depths of the FIFO buffers 106, 110, 118, 124, and 130 can be dependent on the type of data distributions. That is, some depths can be very shallow if typical input matrices satisfy some level of uniformity, such as a uniform distribution of the column and row banks over the number of A elements. The depth of a FIFO buffer can be inversely proportional to the level of uniformity.

In one implementation, the circuitry for formatting the matrix and vector data and performing the matrix multiplication occupies one integrated circuit (IC) die or package, and parts of the memory arrangement 102 having the matrix data can occupy another IC die or package. Memory that is disposed in an IC package/chip that is separate from the package/chip of the formatting and computation circuitry is said to be "off-chip."

The memory arrangement can include P on-chip memory components for storing the vector data elements and P on-chip memory components for storing the output vector.

Figure 4:
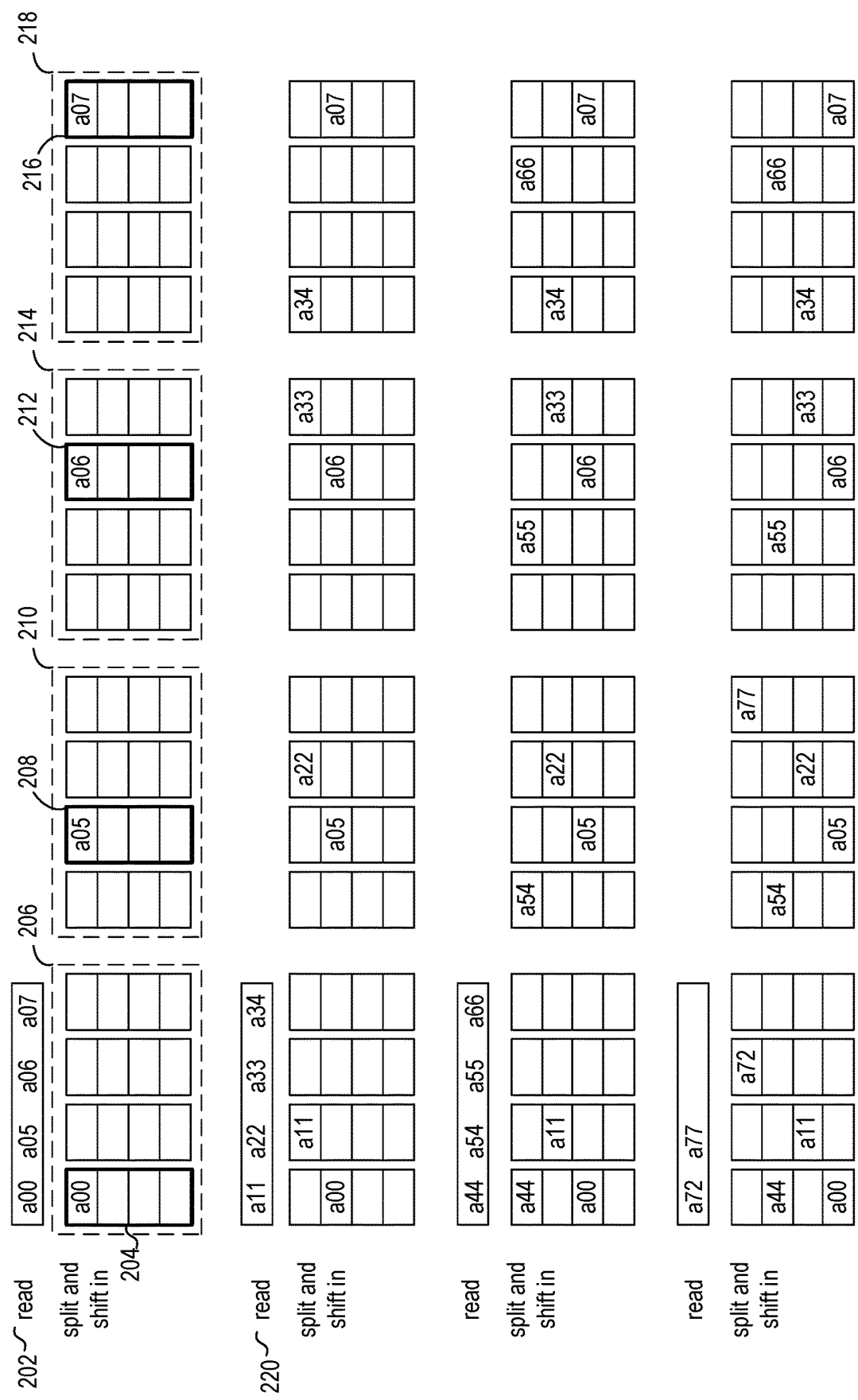
FIG. 4 shows splitting of the matrix data elements into N groups of N FIFO buffers according to columns of the matrix data elements.

FIGS. 4-12 illustrate processing of the exemplary matrix and vector of FIG. 1 by the circuit arrangement of FIG. 3. FIG. 4 shows splitting of the matrix data elements into N groups of N FIFO buffers according to columns of the matrix data elements. In the example, N=4, and there are four groups of four FIFO buffers. The example of FIG. 4 shows a sequence of operations in which groups of matrix data elements are read from the memory arrangement and the matrix data elements are split amongst the four groups of four FIFO buffers.

In a first read operation 202, matrix data elements a00, a05, a06, and a07 are read from the memory arrangement. The circuit 104 (FIG. 3) selects one FIFO buffer of the first group for the first matrix data element of the multiple matrix data elements read, selects one FIFO buffer of the second group for the second matrix data element of the multiple matrix data elements, selects one FIFO buffer of the third group for the third matrix data element of the multiple matrix data elements, and selects one FIFO buffer of the fourth group for the fourth matrix data element of the multiple matrix data elements. The selection of the FIFO buffer within each group is based on the column index of the matrix data element. For N FIFO buffers within a group referenced by 0 through N−1, the FIFO buffer can be selected as (column MOD N), where column is the value of the column index and MOD is a modulo function. The mapping function (such as the MOD) can be selected based on matching the column pairing units 116 and input data distribution. An example of another mapping function is column MOD 1 for column <3 and column MOD (N−3) for column ≥3. The alternative mapping function can be used when the input data A had 3× greater probability of non-zero values in column 0, 1, 2 than any other column.

Circuit 104 selects FIFO buffer 204 of group 206 for matrix data element a00, FIFO buffer 208 of group 210 for matrix data element a05, FIFO buffer 212 of group 214 for matrix data element a06, and FIFO buffer 216 of group 218 for matrix data element a07. The matrix data elements are shifted into the selected FIFO buffers.

In the next read operation 220, matrix data elements a11, a22, and a33, and a34 are read, and the FIFO buffers selected based on the values of the column indices as described above. The matrix data elements a11, a22, and a33, and a34 are shifted into the selected FIFO buffers, and matrix data elements in the other FIFO buffers are also shifted. Empty slots in the FIFO buffers illustrate the timing sequence for pushing data elements into the FIFO buffers. The empty slots are illustrative only and there are no slots that are actually empty in the FIFO buffers when the circuits are operating. The reading, splitting and shifting is repeated for the other matrix data elements as shown, with the last two matrix data elements being a72 and a77.

Figure 5:
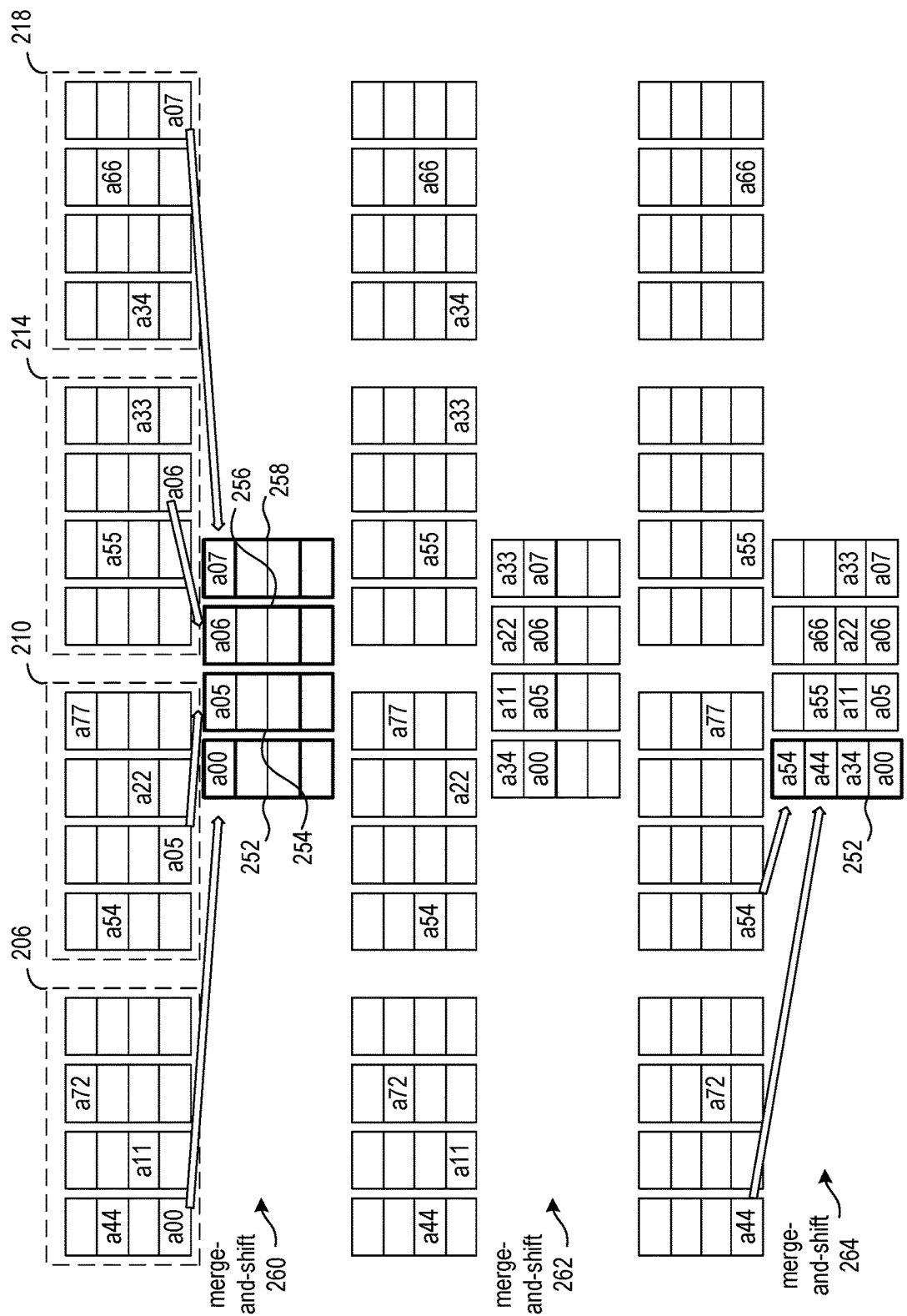
FIG. 5 shows merging of the matrix data elements from the four groups of four FIFO buffers of FIG. 4 into four FIFO buffers.

FIG. 5 shows merging of the matrix data elements from the four groups of four FIFO buffers of FIG. 4 into four FIFO buffers. The merge circuit 108 (FIG. 3) selects from the first FIFO buffer in each group for shifting a matrix data element into FIFO buffer 252, selects from the second FIFO buffer in each group for shifting a matrix data element into FIFO buffer 254, selects from the third FIFO buffer in each group for shifting a matrix data element into FIFO buffer 256, and selects from the fourth FIFO buffer in each group for shifting a matrix data element into FIFO buffer 258.

In the merge-and-shift operation 260, matrix data elements a00, a05, a06, and a07 are shifted into FIFO buffers 252, 254, 256, and 258, respectively. In the merge-and-shift operation 262, matrix data elements a34, a11, a22, and a33 are shifted into the FIFO buffers.

Note that in merge-and-shift operation 264, matrix data elements a44 and a54 are both available for shifting into the FIFO buffer 252. As multiple matrix data elements from the same column are available to shift-in, the merge circuit shifts-in one of the matrix data elements in one cycle and shifts-in the other matrix data element in the next cycle. Since a44 and a54 are both from the same column, two cycles are required to first shift in a44 and then shift in a54. This stalls the next shift of a72 and a77. The stalls are local and add back-pressure onto the previous stage (split) which buffers its data into its FIFO thus does not stall. The FIFO depths and numbers of column and row units can be tuned for distribution (both content and order) of data in typical workload A.

Figure 6:
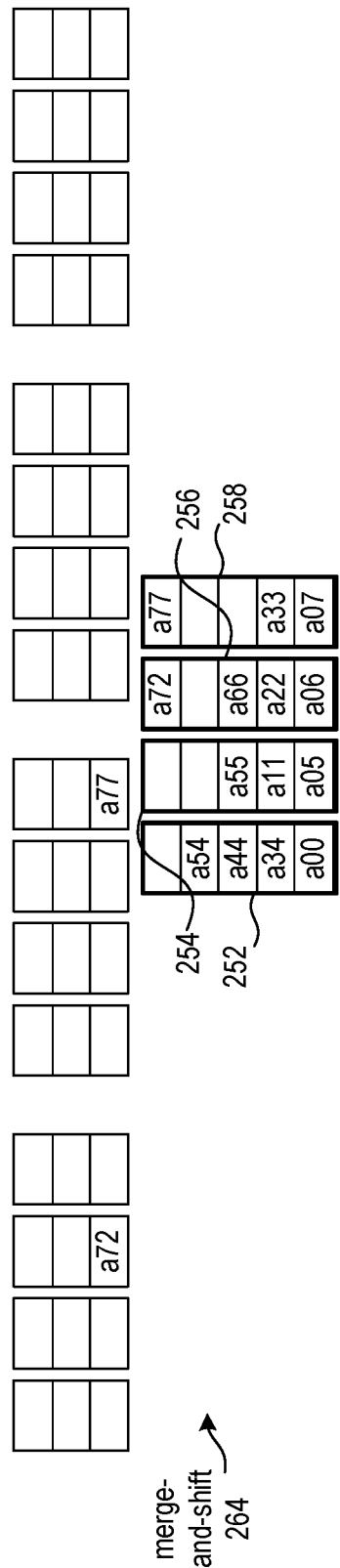
FIG. 6 continues the example of FIG. 5, showing merging of the matrix data elements from the four groups of four FIFO buffers of FIG. 4 into four FIFO buffers.

FIG. 6 continues the example of FIG. 5, showing merging of the matrix data elements from the four groups of four FIFO buffers of FIG. 4 into four FIFO buffers. In merge-and-shift operation 264, matrix data elements a72 and a77 are shifted-in to FIFO buffers 256 and 258. FIG. 6 shows the matrix data elements sorted by column into the FIFO buffers 252, 254, 256, and 258. FIFO buffer 252 has matrix data elements from columns 0 and 4, FIFO buffer 254 has matrix data elements from columns 1 and 5, FIFO buffer 256 has matrix data elements from column 2 and 6, and FIFO buffer 258 has matrix data elements from columns 3 and 7.

Figure 7:
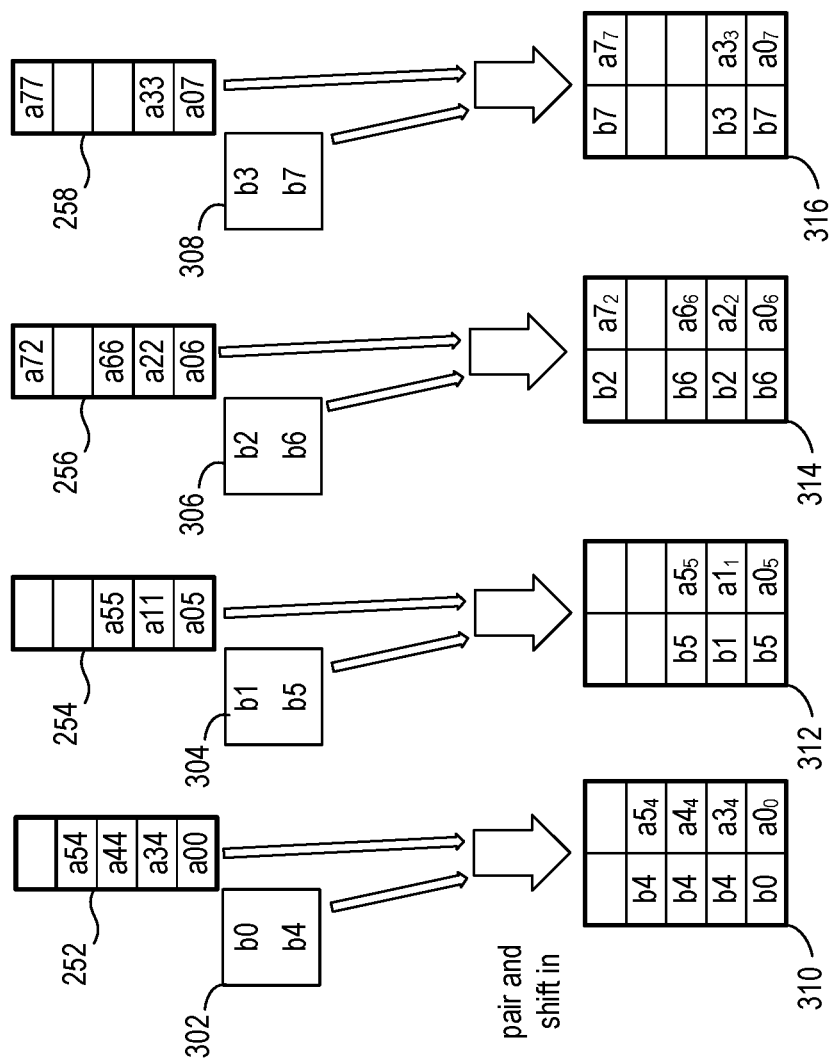
FIG. 7 shows the combining of the matrix data elements, which are separated by column in FIFO buffers, with the vector data elements from vector data banks.

FIG. 7 shows the combining of the matrix data elements, which are separated by column mapping in the FIFO buffers 252, 254, 256, and 258, with the vector data elements from the vector data banks 302, 304, 306, and 308. Vector data elements b0 and b4 are available in bank 302, vector data elements b1 and b5 are available in bank 304, vector data elements b2 and b6 are available in bank 306, and vector data elements b3 and b7 are available in bank 308. Note that FIG. 7 shows all matrix data elements and paired vector data elements having been shifted-in to the FIFO buffers 310, 312, 314, and 316 and omits showing cycle-by-cycle pairing and shifts.

The column of the matrix data element is used to select a vector element from the vector bank for pairing, and the paired elements are shifted-in to the FIFO buffers 310, 312, 314, and 316. For example, the first matrix data element available in FIFO buffer 252 is a00. The column value 0 MOD N is used to index/address bank 0 (302) and read the referenced vector data element b0. The column portion of the a00 can be discarded, as it is no longer needed, and a0 and b0 are shifted-in to the FIFO buffer 310. The column index value is shown as a subscript in the FIFO buffers 310, 312, 314, and 316 for ease of reference.

Figure 8:
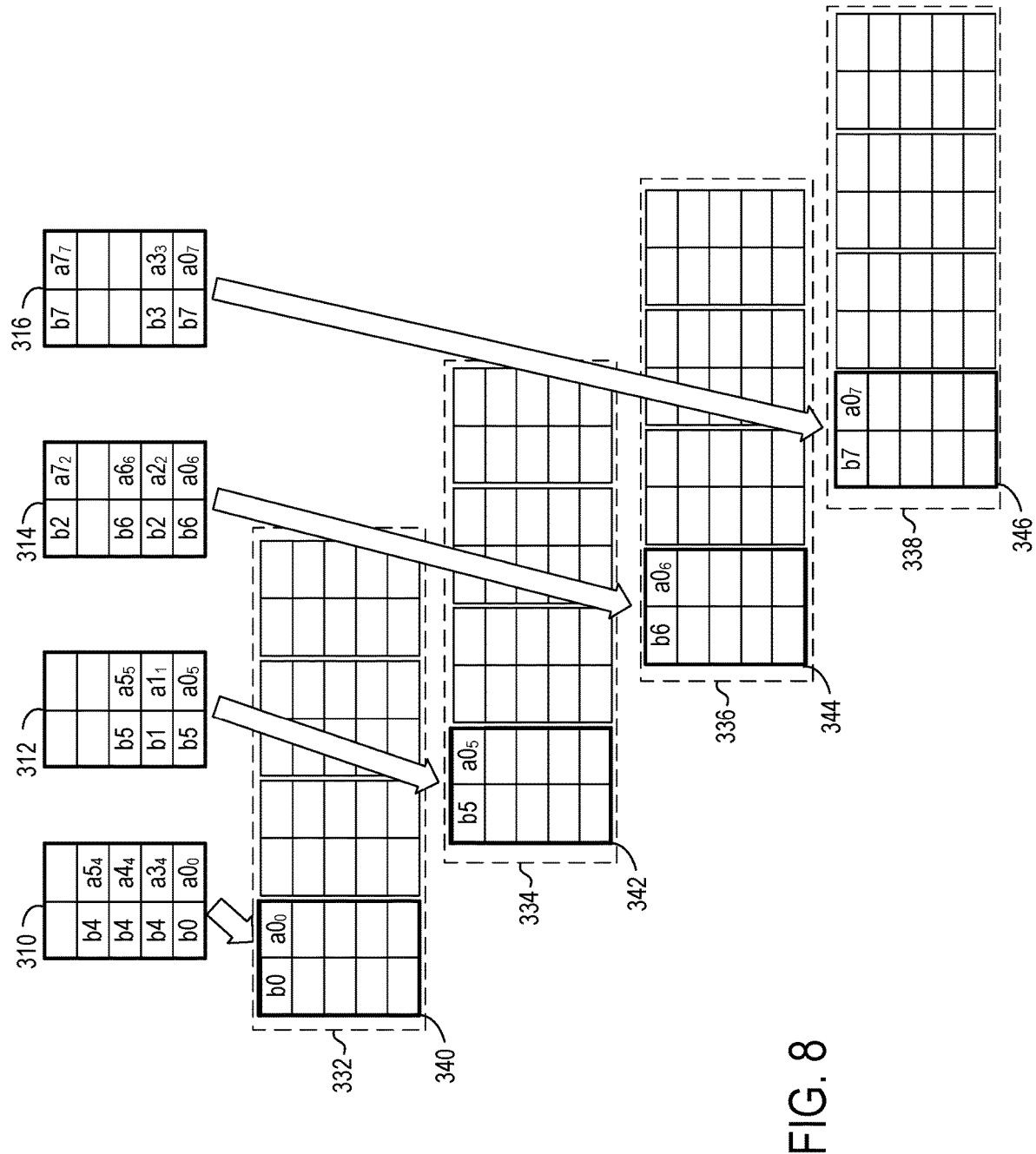
FIG. 8 shows splitting of the paired vector-matrix data elements from FIG. 7 into N groups of N FIFO buffers according to rows of the matrix data elements.
Figure 9:
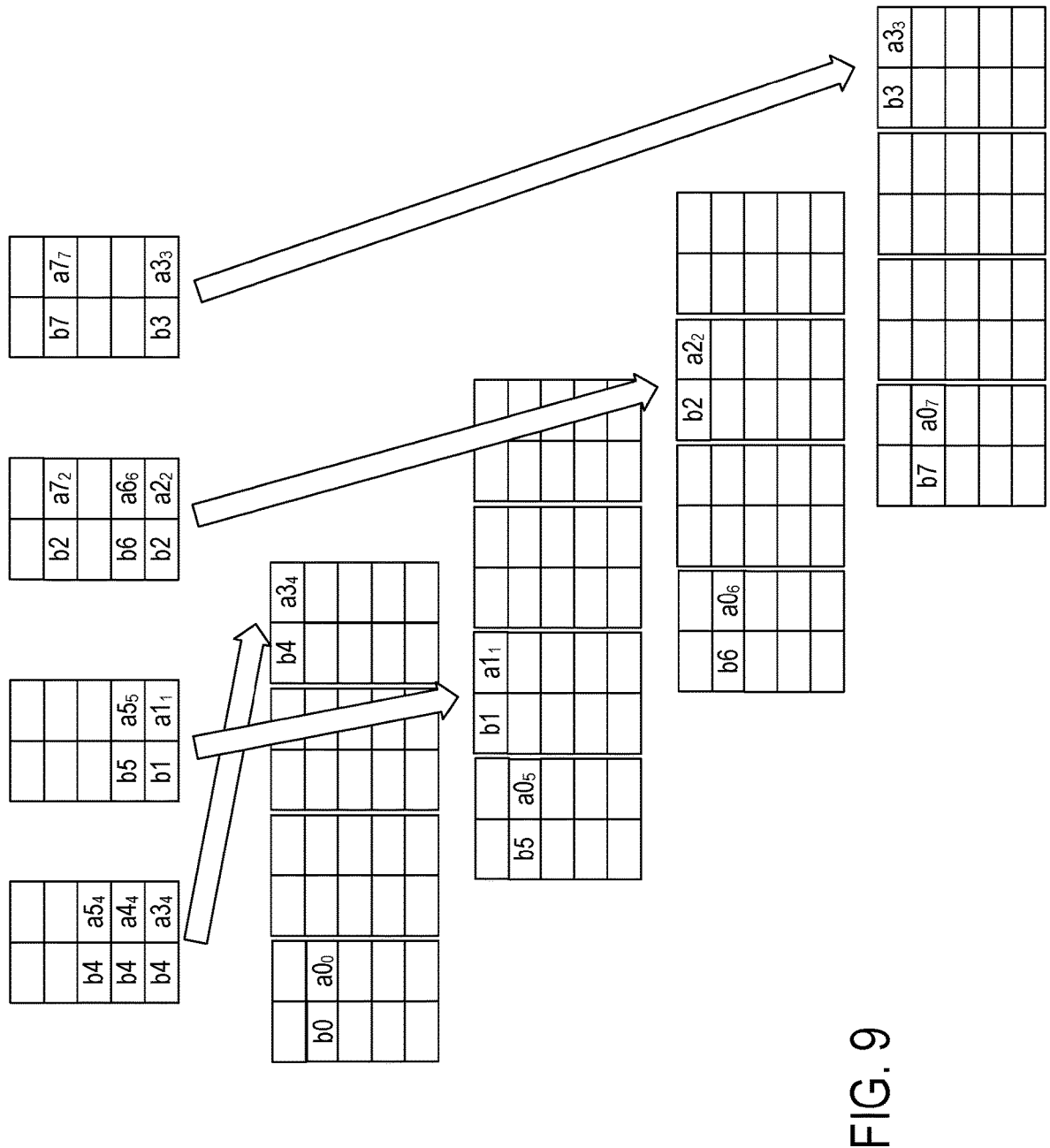
FIGS. 9, 10, 11, and 12 continue the example of FIG. 8 with the splitting of the paired vector-matrix elements into the four FIFO buffers of the four groups.
Figure 10:
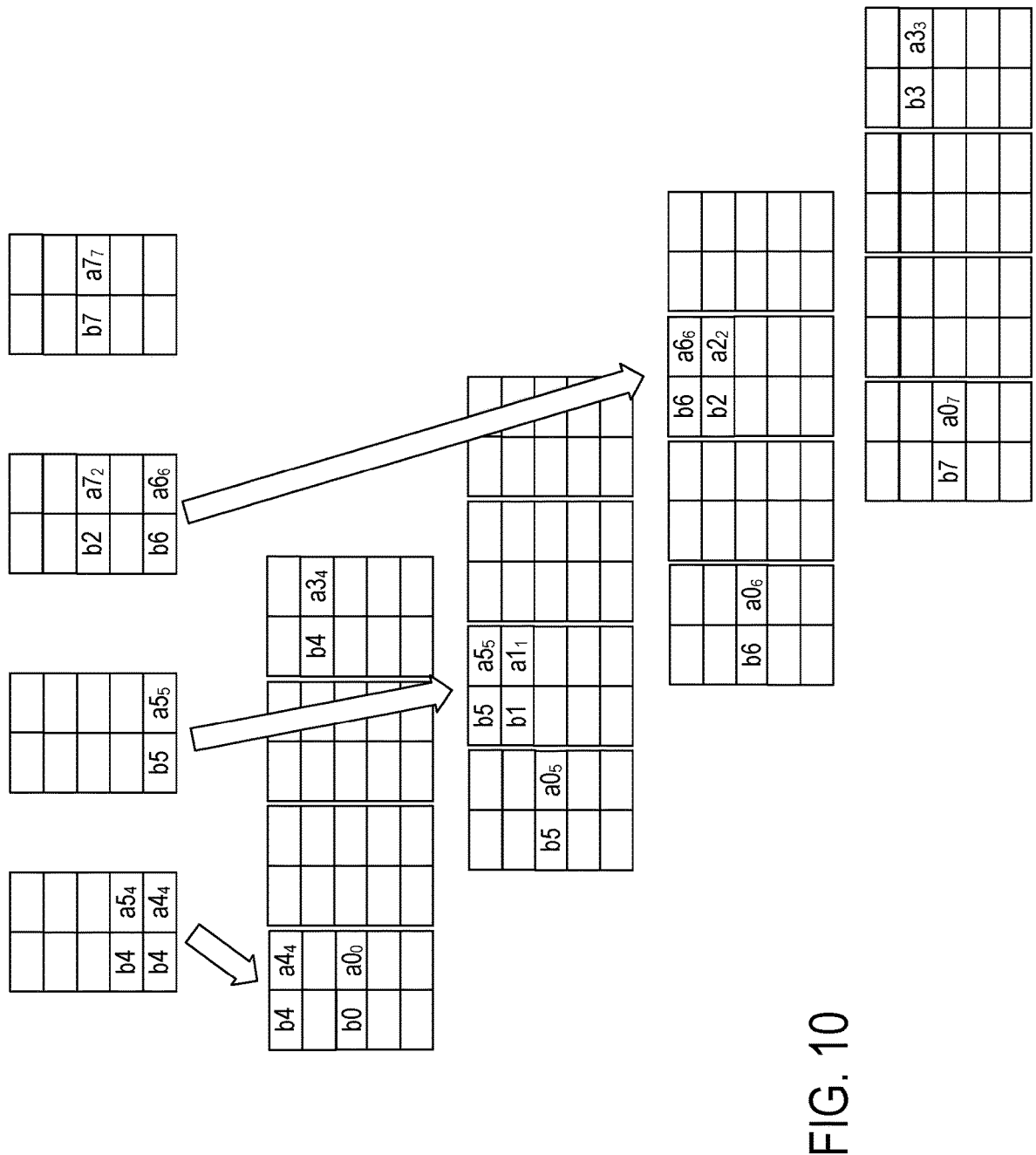
Figure 11:
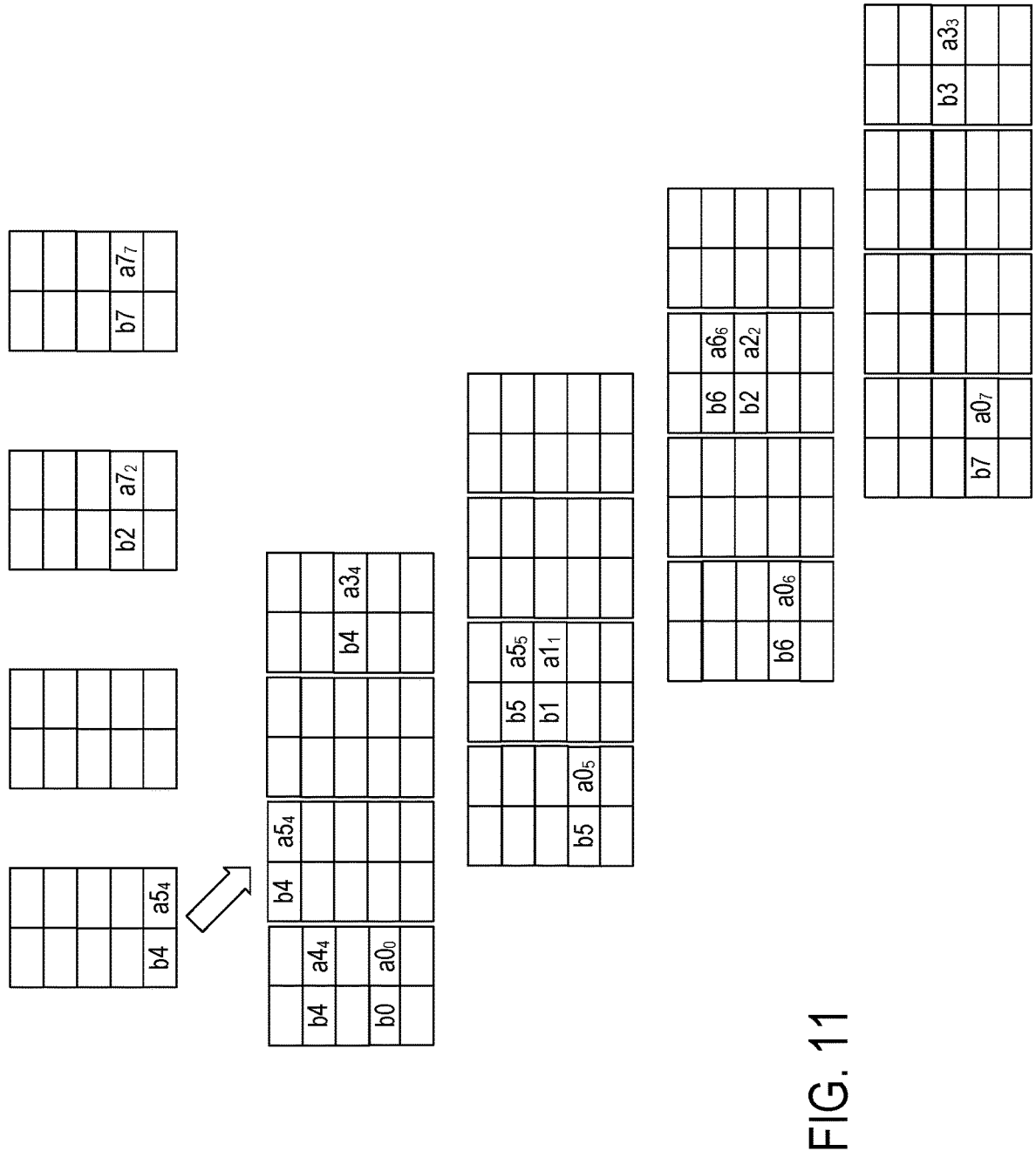

FIG. 8 shows splitting of the paired vector-matrix data elements from FIG. 7 into N groups of N FIFO buffers according to rows of the matrix data elements. The row-split-merge circuit 122 (FIG. 3) selects one of the FIFO buffers in group 332 for shifting-in the paired vector-matrix elements from FIFO buffer 310, selects one of the FIFO buffers in group 334 for shifting-in the vector-matrix elements from FIFO buffer 312, selects one of the FIFO buffers in group 338 for shifting-in the vector-matrix elements from FIFO buffer 314, and selects one of the FIFO buffers in group 336 for shifting-in the vector-matrix elements from FIFO buffers 316.

The selection of the FIFO buffer within each group is based on the row index of the matrix data element. For N FIFO buffers within a group referenced by 0 through N−1, the FIFO buffer can be selected as (row MOD P), where row is the value of the row index and MOD is a modulo function or other mapping function. Circuit 122 selects FIFO buffer 340 of group 332 for paired vector-matrix elements b0-a0$_0$, selects FIFO buffer 342 of group 334 for paired vector-matrix elements b5-a0$_5$, selects FIFO buffer 344 of group 336 for paired vector-matrix elements b6-a0$_6$, selects FIFO buffer 346 of group 338 for paired vector-matrix elements b7-a0$_7$. The paired vector-matrix elements are shifted into the selected FIFO buffers.

FIGS. 9, 10, 11, and 12 continue the example of FIG. 8 with the splitting of the paired vector-matrix elements into the four FIFO buffers of the four groups.

Figure 12:
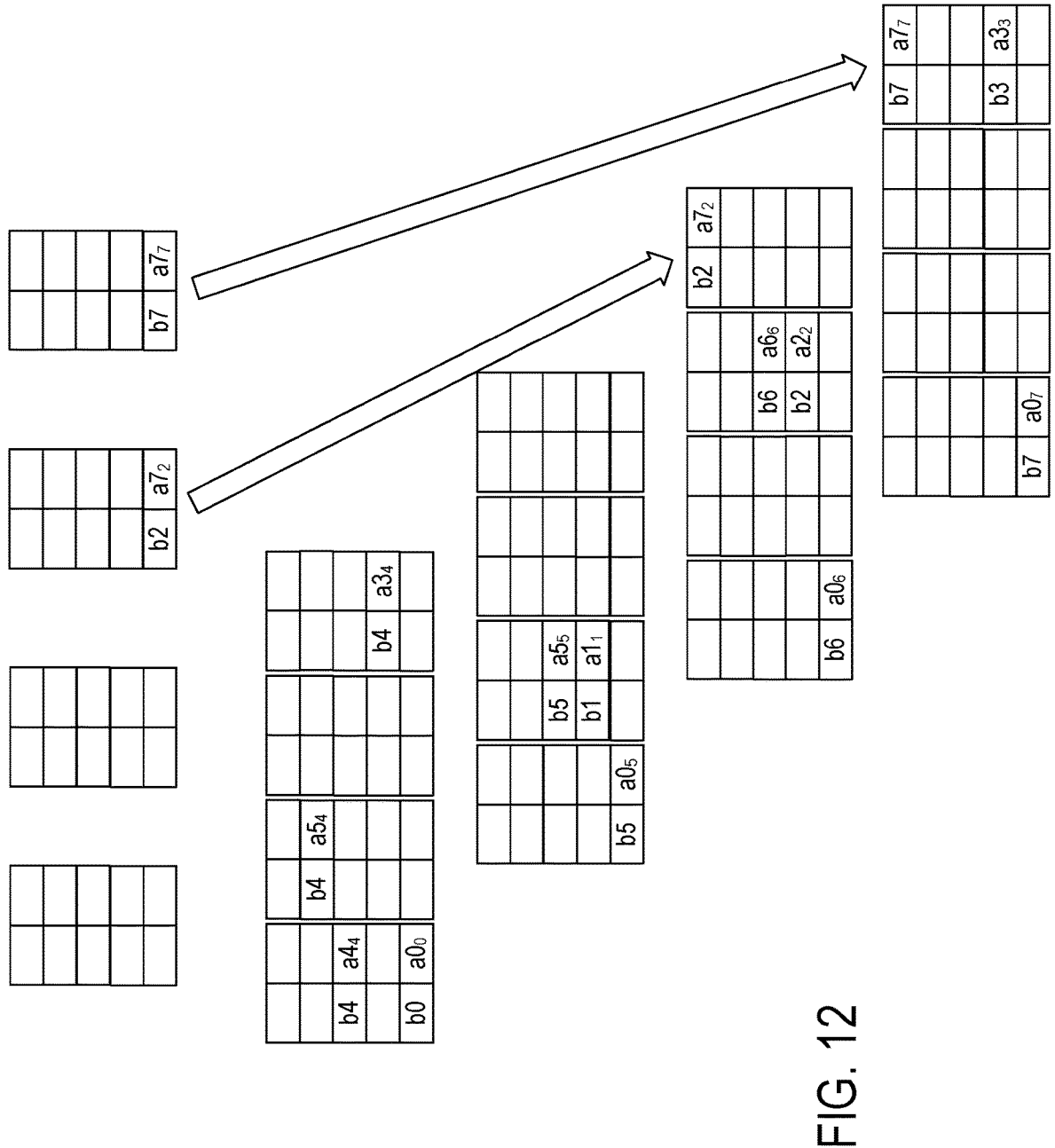
Figure 13:
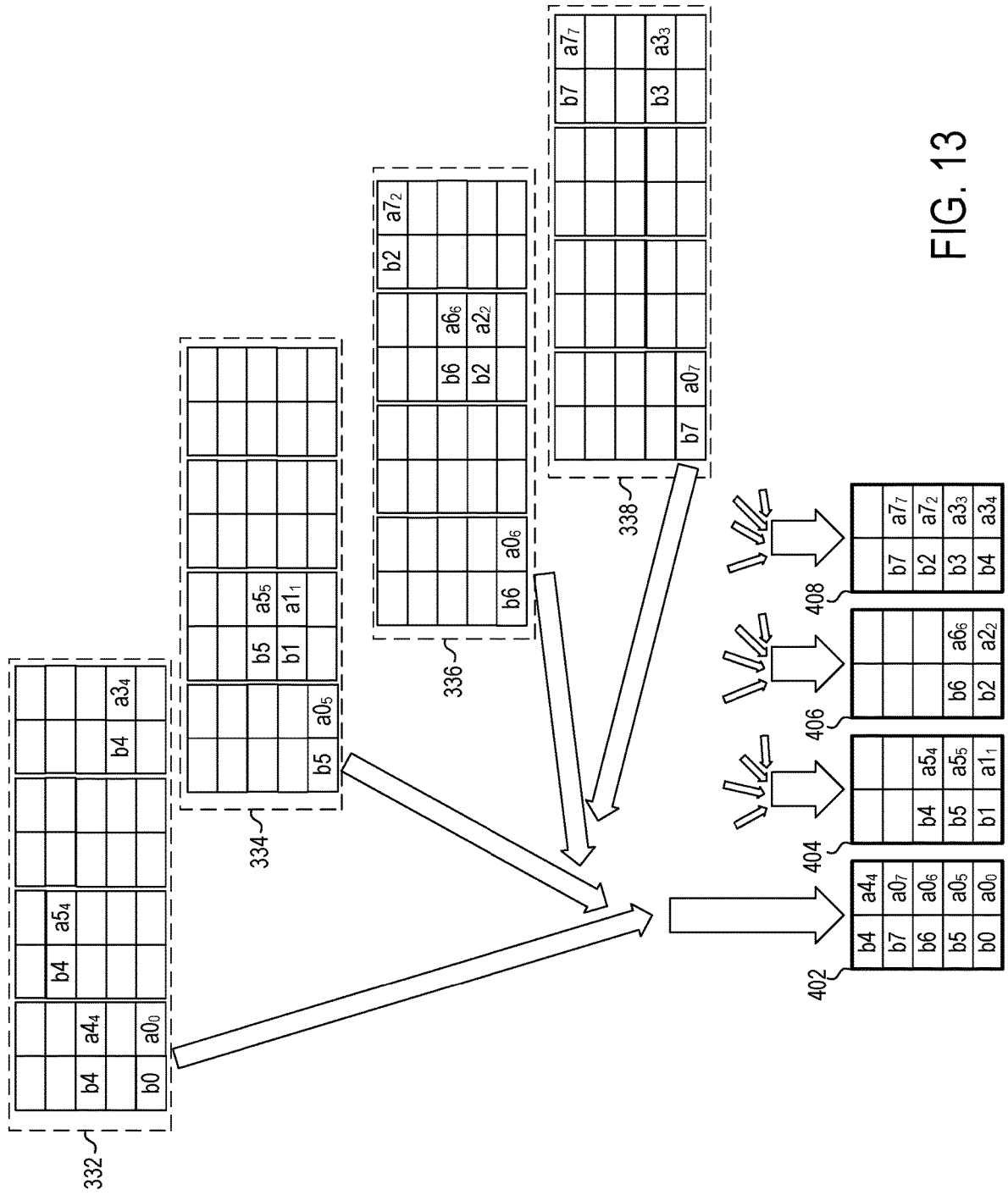
FIG. 13 shows merging of the paired matrix-vector data elements from the four groups of four FIFO buffers of FIG. 12 into four FIFO buffers.

FIG. 13 shows merging of the paired matrix-vector data elements from the four groups of four FIFO buffers of FIG. 12 into four FIFO buffers. Specifically, FIG. 13 shows the state of the four groups 332, 334, 336, and 338 of FIFO buffers after having shifting in all the paired matrix-vector elements, and shows the state of the four FIFO buffers 402, 404, 406, and 408 after having merged the paired elements from the 4 groups of FIFO buffers into the 4 FIFO buffers.

The row-split-merge circuit 122 (FIG. 3) selects from the first FIFO buffer in each group for shifting a matrix data element into FIFO buffer 402, selects from the second FIFO buffer in each group for shifting a matrix data element into FIFO buffer 404, selects from the third FIFO buffer in each group for shifting a matrix data element into FIFO buffer 406, and selects from the fourth FIFO buffer in each group for shifting a matrix data element into FIFO buffer 408.

The ordered contents of the FIFO buffers provides paired matrix-vector elements to the MAC circuits 126, . . . , 128 (FIG. 3) for computing dot products. For example, FIFO buffer 402 has paired matrix-vector elements b0-a0$_0$, b5-a0$_5$, b6-a0$_6$ and b7y-a0$_7$ for computing: a00*b0+a05*b5+ a06*b6+a07*b7. A change in value of the row value of a paired matrix-vector element indicates to the MAC circuit that accumulation should be reset in order to begin computing the dot product of another row of the matrix.

Figure 14:
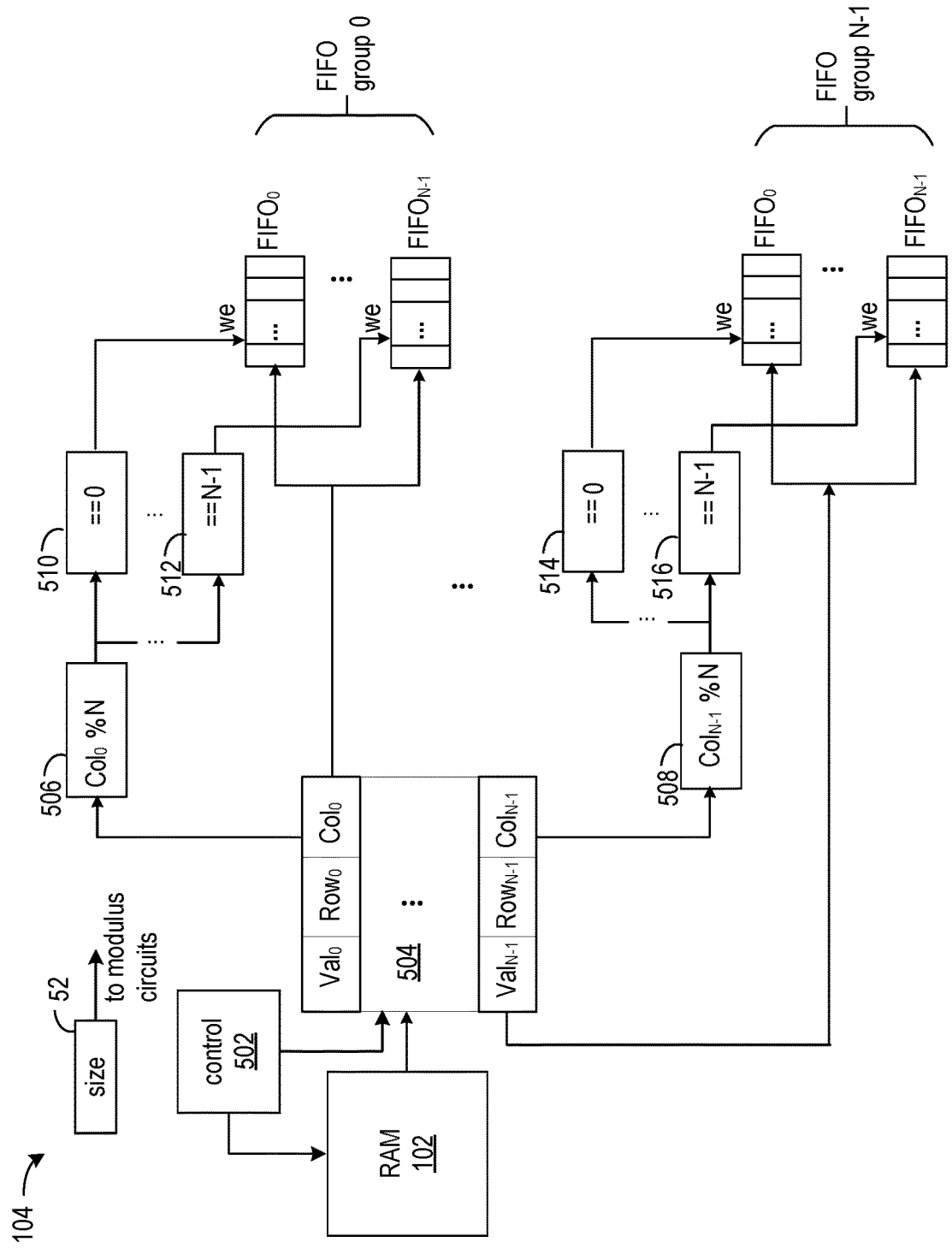
FIG. 14 shows a circuit diagram of a circuit that reads matrix data elements and splits the data elements amongst N groups of N FIFO buffers.

FIG. 14 shows a circuit diagram of circuit 104, which reads matrix data elements and splits the data elements amongst N groups of N FIFO buffers. Control circuit 502 provides address and control signals to the memory arrangement 102 for reading matrix data elements and provides control signals for storing the matrix data elements in the register 504. In each read operation, N matrix data elements are read from the memory arrangement 102 and stored in the register 504. The value of each matrix data element is denoted "Val$_i$," the row of each data element is denoted "Row$_i$," and the column of each data element is denoted "Col$_i$," where i references one of the matrix data elements in the register, and $0 \leq i \leq N-1$.

Each matrix data element in the register 504 is associated with one of the groups of FIFO buffers, and the column index value is used to select and enable storing to one of the FIFO buffers in the group. In the exemplary circuit, the matrix data element having Col$_0$ is associated with FIFO group 0, the matrix data element having Col$_1$ is associated with FIFO group 1, . . . , and the matrix data element having Col$_{N-1}$ is associated with FIFO group N−1.

The column index of each matrix data element is input to a modulo circuit. For example, Col$_0$ is input to modulo circuit 506, and Col$_{N-1}$ is input to modulo circuit 508. Each modulo circuit computes the Col$_i$ MOD N. The value output from each modulo circuit is input to multiple comparator circuits, and each comparator circuit compares the input value to one of the values from 0 to N−1. The output from each comparator circuit is a write enable signal to one of the N FIFO buffers within one of the N groups of buffers. For example, comparator circuit 510 provides the write enable signal to FIFO buffer 0 in group 0, . . . , and comparator circuit 512 provides the write enable signal to FIFO buffer N−1 in FIFO group 0. Similarly, comparator circuit 514 provides the write enable signal to FIFO buffer 0 in group N−1, . . . , and comparator circuit 516 provides the write enable signal to FIFO buffer N−1 in FIFO group N−1.

The size register 52 can be connected to each of the modulo circuits 506, . . . , 508 to indicate the number of bits of the row-column portion of the matrix data elements that are to be interpreted as the column value. As explained above, mapping functions other than modulo can be employed.

Figure 15:
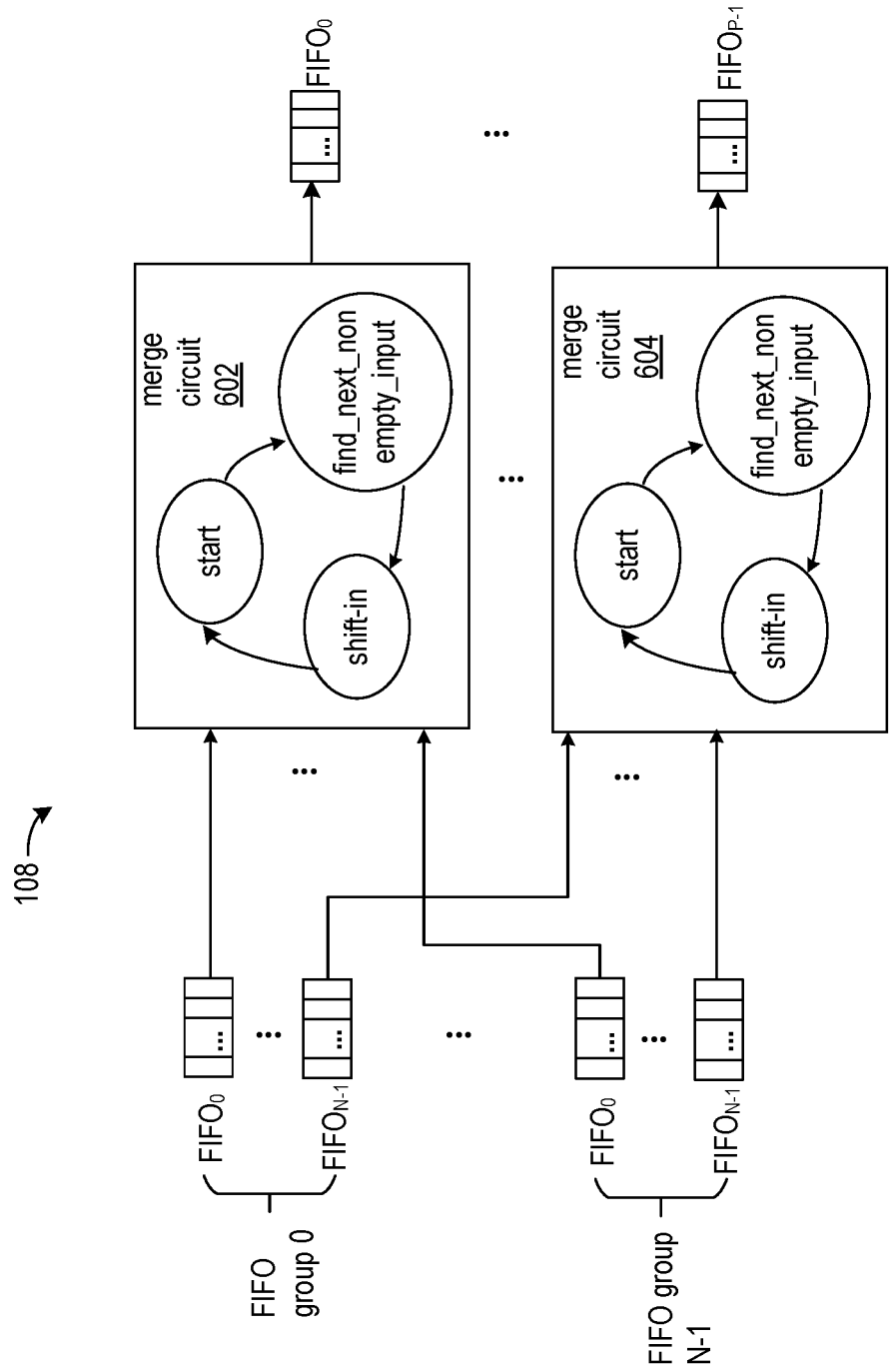
FIG. 15 shows a circuit diagram of a circuit that merges matrix data elements from the N groups of N FIFO buffers into N FIFO buffers.

FIG. 15 shows a circuit diagram of circuit 108, which merges matrix data elements from the N groups of N FIFO buffers into N FIFO buffers. Circuit 108 includes multiple merge circuits 602, . . . , 604. Each merge circuit is coupled to receive matrix data elements from one of the N FIFO buffers in each of the N groups. For example, merge circuit 602 is coupled to receive matrix data elements from FIFO buffer 0 in each of FIFO groups 0 through N−1, and merge circuit 604 is coupled to receive matrix data elements from FIFO buffer N−1 in each of the FIFO groups 0 through N−1.

Each merge circuit can be implemented as a state machine that takes matrix data elements from the multiple inputs and shifts the matrix data elements into the associated FIFO buffer. The merge circuit can service the inputs according to a round-robin schedule, for example. For example, the merge circuit can cycle through the inputs from 0 to N−1 checking for a non-empty input from the FIFO buffers. The merge circuit can then shift the matrix data element from the first-encountered non-empty input into the FIFO buffer. After shifting the matrix data element into the FIFO buffer, the merge circuit can repeat the cycle looking for the next non-empty input.

Figure 16:
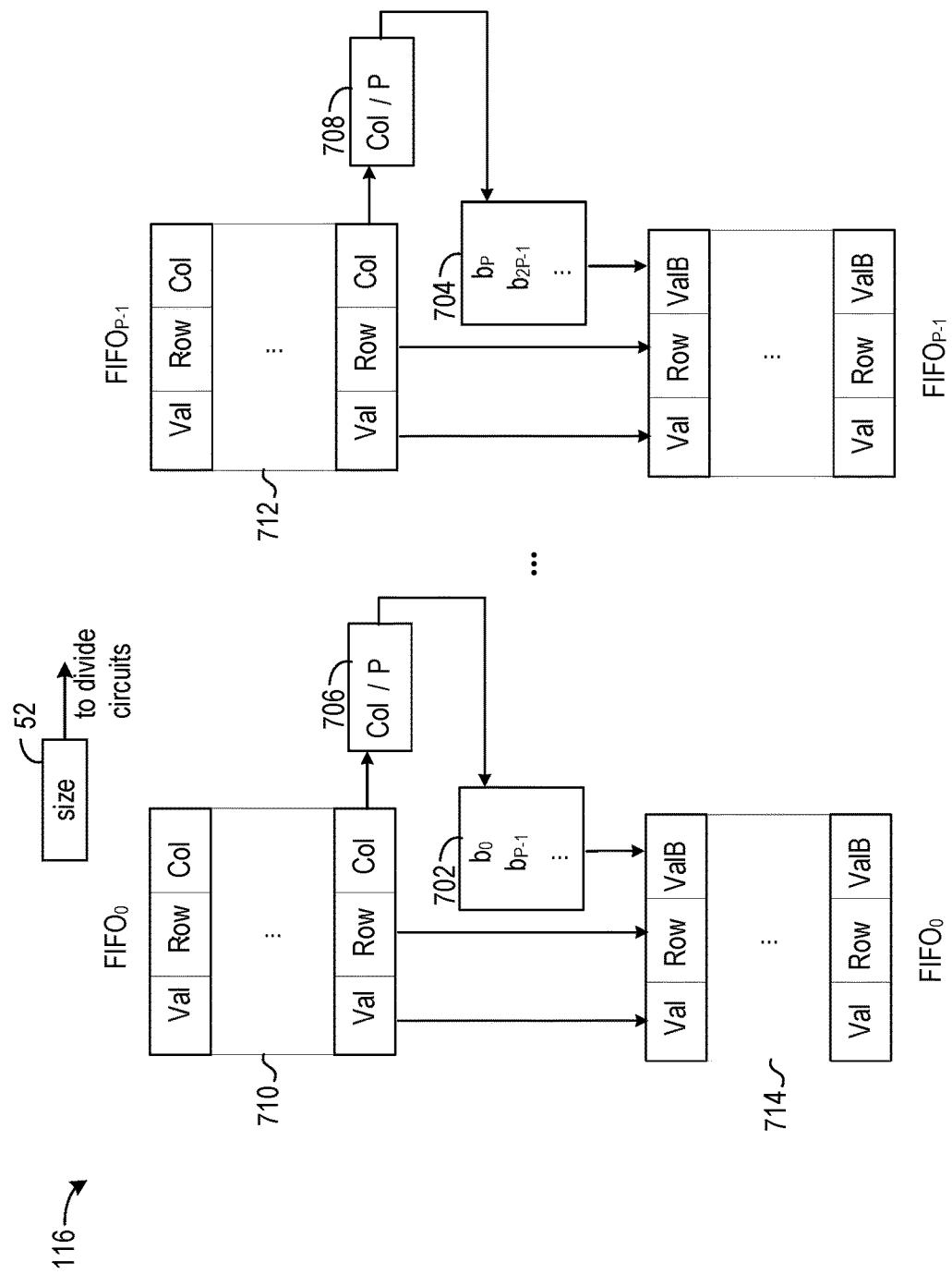
FIG. 16 shows a circuit diagram of the circuit that pairs matrix data elements with vector data elements.

FIG. 16 shows a circuit diagram of the circuit 116 (FIG. 3) that pairs matrix data elements with vector data elements. The exemplary circuit includes P vector banks, vector bank 0 shown as block 702 and vector bank P−1 shown as block 704. Each bank stores a subset of the vector data elements. The vector banks can be referenced as $bank_0$ through $bank_{P-1}$. The vector data elements can be denoted $b_k$, where k is an index of the data element in the vector and $0 \le k \le P-1$. A vector data element $b_k$ is in $bank_m$, for $0 \le m \le N-1$, if k MOD P=m.

The circuit 116 further includes P divider circuits. Divider circuit 706 is associated with FIFO buffer 710 ($FIFO_0$), and divider circuit 708 is associated with FIFO buffer 712 ($FIFO_{P-1}$). Each divider circuit inputs the column value from the output of the FIFO buffer and divides the column value by P to obtain an index/address into one of the vector banks. The index/address is input to the associated vector bank, and the vector bank outputs the referenced vector data element. For example, divider circuit 706 inputs the column value at the output of FIFO buffer 710 and divides the column value by P. More specifically, the column mapping function maps the A column into a bank id and a local index. The simplest case is divide and reminder. The full column index need not be present in the FIFO buffer 710. The column index can be a local column index. The result is input to vector bank 702, which outputs the vector data element for storage in FIFO buffer 714. The value and the row index of the matrix data element at the output of the FIFO buffer 710 are also shifted into the FIFO buffer 714. The column value is discarded as it is no longer needed.

The size register 52 can be connected to each of the divider circuits 706, . . . , 708 to indicate the number of bits of the row-column portion of the matrix data elements that are to be interpreted as the column value.

Figure 17:
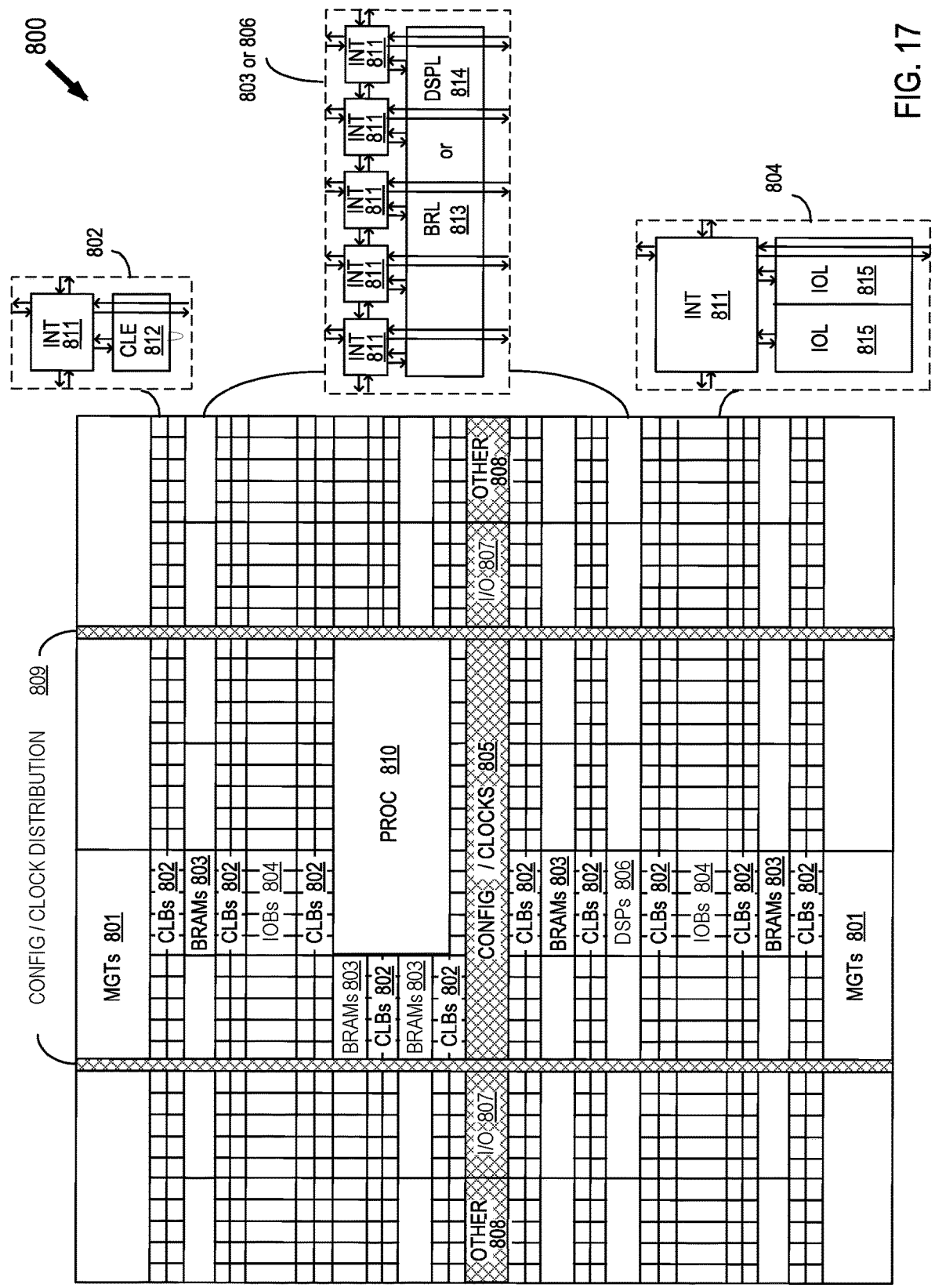
FIG. 17 shows a programmable integrated circuit (IC) on which the disclosed circuits and processes may be implemented.

FIG. 17 shows a programmable integrated circuit (IC) 800 on which the disclosed circuits and processes may be implemented. The programmable IC may also be referred to as a System On Chip (SOC) that includes field programmable gate array logic (FPGA) along with other programmable resources. FPGA logic may include several different types of programmable logic blocks in the array. For example, FIG. 8 illustrates programmable IC 800 that includes a large number of different programmable tiles including multi-gigabit transceivers (MGTs) 801, configurable logic blocks (CLBs) 802, random access memory blocks (BRAMs) 803, input/output blocks (IOBs) 804, configuration and clocking logic (CONFIG/CLOCKS) 805, digital signal processing blocks (DSPs) 806, specialized input/output blocks (I/O) 807, for example, clock ports, and other programmable logic 808 such as digital clock managers, analog-to-digital converters, system monitoring logic, and so forth. Some programmable IC having FPGA logic also include dedicated processor blocks (PROC) 810 and internal and external reconfiguration ports (not shown).

In some FPGA logic, each programmable tile includes a programmable interconnect element (INT) 811 having standardized connections to and from a corresponding interconnect element in each adjacent tile. Therefore, the programmable interconnect elements taken together implement the programmable interconnect structure for the illustrated FPGA logic. The programmable interconnect element INT 811 also includes the connections to and from the programmable logic element within the same tile, as shown by the examples included at the top of FIG. 17.

For example, a CLB 802 can include a configurable logic element CLE 812 that can be programmed to implement user logic, plus a single programmable interconnect element INT 811. A BRAM 803 can include a BRAM logic element (BRL) 813 in addition to one or more programmable interconnect elements. Typically, the number of interconnect elements included in a tile depends on the height of the tile. The illustrated BRAM tile has the same height as five CLBs, but other numbers (e.g., four) can also be used. A DSP tile 806 can include a DSP logic element (DSPL) 814 in addition to an appropriate number of programmable interconnect elements. An IOB 804 can include, for example, two instances of an input/output logic element (IOL) 815 in addition to one instance of the programmable interconnect element INT 811. As will be clear to those of skill in the art, the actual I/O bond pads connected, for example, to the I/O logic element 815, are manufactured using metal layered above the various illustrated logic blocks, and typically are not confined to the area of the input/output logic element 815.

A columnar area near the center of the die (shown shaded in FIG. 17) is used for configuration, clock, and other control logic. Horizontal areas 809 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 17 include additional logic blocks that disrupt the regular columnar structure making up a large part of the programmable IC. The additional logic blocks can be programmable blocks and/or dedicated logic. For example, the processor block PROC 810 shown in FIG. 17 spans several columns of CLBs and BRAMs.

Note that FIG. 17 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 17 are purely exemplary. For example, in an actual programmable IC, more than one adjacent column of CLBs is typically included wherever the CLBs appear, to facilitate the efficient implementation of user logic.

Those skilled in the art will appreciate that various alternative computing arrangements, including one or more processors and a memory arrangement configured with program code, would be suitable for hosting the processes and data structures disclosed herein. In addition, the processes may be provided via a variety of computer-readable storage media or delivery channels such as magnetic or optical disks or tapes, electronic storage devices, or as application services over a network.

Though aspects and features may in some cases be described in individual figures, it will be appreciated that features from one figure can be combined with features of another figure even though the combination is not explicitly shown or explicitly described as a combination.

The circuits and methods are thought to be applicable to a variety of systems for formatting data for matrix multiplication and performing matrix multiplication. Other aspects and features will be apparent to those skilled in the art from consideration of the specification. The circuits and methods may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A circuit arrangement comprising:
   a memory arrangement configured for storage of a matrix having C columns and R rows of matrix data elements specified as index-value pairs that indicate respective row and column indices and associated values;
   a first set of first-in-first-out (FIFO) buffers including P FIFO buffers;
   first split-and-merge circuitry coupled between the memory arrangement and the first set of FIFO buffers and configured to read the matrix data elements from the memory arrangement and put the matrix data elements in the first set of FIFO buffers based on the associated column indices;
   a second set of FIFO buffers including P FIFO buffers;
   a pairing circuit coupled to the memory arrangement and between the first and second sets of FIFO buffers and configured to read vector data elements and pair the vector data elements with the matrix data elements and put the vector data elements and paired matrix data elements in the second set of FIFO buffers based on the associated column indices;
   a third set of FIFO buffers including P FIFO buffers; and
   second split-and-merge circuitry coupled between the second and third sets of FIFO buffers and configured to read paired matrix data elements and vector data elements from the second set of FIFO buffers and put the paired matrix data elements and vector data elements in the third set of FIFO buffers based on the associated row indices.

2. The circuit arrangement of claim 1, further comprising:
   a fourth set of FIFO buffers including P FIFO buffers; and
   a plurality of multiply-and-accumulate (MAC) circuits coupled between the third and fourth sets of FIFO buffers, each MAC circuit configured to read the paired matrix data elements and vector data elements from the third set of FIFO buffers, multiply the paired matrix data elements and vector data elements, accumulate products by row, and put accumulated products in the fourth set of FIFO buffers based on the associated row indices.

3. The circuit arrangement of claim 2, further comprising:
   a load-store circuit; and
   a plurality of adder circuits coupled to the fourth set of FIFO buffers and to the load-store circuit;
   wherein:
     the adder circuits are configured to read accumulated products from the fourth set of FIFO buffers and add the accumulated products from the fourth set of FIFO buffers to accumulated products provided by the load-store circuit; and
     the load-store circuit is configured to store accumulated products from the plurality of adder circuits, load accumulated products, and provide the accumulated products to the plurality of adder circuits.

4. The circuit arrangement of claim 3, further comprising:
   a first integrated circuit (IC) die, wherein the memory arrangement is disposed on the first IC die;
   a second IC die, wherein the first set of FIFO buffers, the first split-and-merge circuitry, the second set of FIFO buffers, the pairing circuit, the third set of FIFO buffers, and the second split-and-merge circuitry are disposed on the second IC die;
   P individually addressable memory circuits disposed on the second IC die and configured for storage of the vector data elements, wherein N is equal to a number of index-value pairs read by the first split-and-merge circuitry from each access to the memory arrangement; and
   P individually addressable memory circuits disposed on the second IC die and configured for storage of the accumulated products.

5. The circuit arrangement of claim 1, wherein each respective row and column index of an index-value pair is stored in a single addressable data unit, and further comprising:
   a register that is configurable with an index allocation value that indicates bits of the single addressable data unit allocated to the row index and to the column index.

6. The circuit arrangement of claim 1, wherein the first split-and-merge circuitry is configured to read N index-value pairs in parallel.

7. The circuit arrangement of claim 6, further comprising:
   a fourth set of FIFO buffers including N groups of N FIFO buffers; and
   wherein the first split-and-merge circuitry is coupled to the fourth set of FIFO buffers and is configured to put each of the N index-value pairs in one FIFO buffer of one of the N groups of the fourth set of FIFO buffers based on the respective column index.

8. The circuit arrangement of claim 7, wherein the first split-and-merge circuitry includes N merge circuits coupled to the fourth set of FIFO buffers, wherein:
   each merge circuit is coupled to respective ones of the N FIFO buffers in the N groups of N FIFO buffers of the fourth set of FIFO buffers; and
   each merge circuit is configured to read index-value pairs from the respective ones of the N FIFO buffers in the N groups of N FIFO buffers of the fourth set of FIFO buffers and put the index-value pairs in one of the first set of FIFO buffers.

9. The circuit arrangement of claim 8, further comprising:
   a fifth set of FIFO buffers including P groups of P FIFO buffers; and
   wherein the second split-and-merge circuitry is coupled to the fifth set of FIFO buffers and is configured to put the paired matrix data elements and vector data elements in one FIFO buffer of one of the P groups of the fifth set of FIFO buffers based on the respective row index.

10. The circuit arrangement of claim 9, wherein the second split-and-merge circuitry includes P merge circuits coupled to the fifth set of FIFO buffers, wherein:
    each merge circuit is coupled to respective ones of the P FIFO buffers in the P groups of P FIFO buffers of the fifth set of FIFO buffers; and each merge circuit is configured to read index-value pairs from the respective ones of the P FIFO buffers in the P groups of P FIFO buffers of the fifth set and put the index-value pairs in one of the third set of FIFO buffers.

11. The circuit arrangement of claim 1, further comprising:
a first integrated circuit (IC) die, wherein the memory arrangement is disposed on the first IC die; and
a second IC die, wherein the first set of FIFO buffers, the first split-and-merge circuitry, the second set of FIFO buffers, the pairing circuit, the third set of FIFO buffers, and the second split-and-merge circuitry are disposed on the second IC die.

12. The circuit arrangement of claim 11, further comprising P individually addressable memory circuits disposed on the second IC die and configured for storage of the vector data elements, wherein P is equal to a number of index-value pairs read by the first split-and-merge circuitry from each access to the memory arrangement.

13. The circuit arrangement of claim 12, further comprising a load circuit coupled to the P individually addressable memory circuits and configured to read a plurality of vector data elements in a single RAM access and store each vector data element into one of the P memory circuits.

14. The circuit arrangement of claim 1, wherein depths of the first, second, and third sets of FIFO buffers correspond to distribution and order or the matrix data elements in the C columns of the matrix.

15. The circuit arrangement of claim 1, wherein the first split-and-merge circuitry is configured to put the matrix data elements in the first set of FIFO buffers based on the associated column indices and distribution matrix data elements in columns of the matrix.

16. A method comprising:
reading matrix data elements of a matrix from a memory arrangement and putting the matrix data elements in a first set of first-in-first-out (FIFO) buffers based on the associated column indices, wherein the matrix has C columns and R rows of matrix data elements specified as index-value pairs that indicate respective row and column indices and associated values, and the first set of FIFO buffers includes P FIFO buffers;
reading vector data elements from the memory arrangement;
pairing the vector data elements with the matrix data elements;
putting the paired matrix and vector data elements in a second set of FIFO buffers based on the associated column indices, wherein the second set of FIFO buffers includes P FIFO buffers;
reading the paired matrix and vector data elements from the second set of FIFO buffers and putting the paired matrix and vector data elements in a third set of FIFO buffers based on the associated row indices, wherein the third set of FIFO buffers includes P FIFO buffers.

17. The method of claim 16, further comprising:
reading the paired matrix data elements and vector data elements from the third set of FIFO buffers in parallel by a plurality of multiply-and-accumulate (MAC) circuits;
multiplying the paired matrix data elements and vector data elements in parallel by the plurality of MAC circuits;
accumulating by row in parallel by the plurality of MAC circuits, products of the paired matrix data elements and vector data elements; and
putting accumulated products in a fourth set of FIFO buffers based on the associated row indices, wherein the fourth set of FIFO buffers includes P FIFO buffers.

18. The method of claim 17, further comprising:
reading accumulated products in parallel by a plurality of adder circuits from the fourth set of FIFO buffers and adding the accumulated products from the fourth set of FIFO buffers to previously accumulated products by the plurality of adder circuits; and
storing accumulated products from the plurality of adder circuits in the memory arrangement.

19. The method claim 16, further comprising selecting numbers of bits of an index portion of each index-value pair for the respective row and column indices based on a configurable index allocation value stored in a register.

20. The method of claim 16, wherein the reading matrix data elements includes reading a plurality of matrix data elements in parallel from the memory arrangement.

* * * * *